April 25, 1967   M. S. WITHERS   3,315,740
FLEXIBLE PLASTIC TUBE BUNDLE AND METHOD OF MAKING
Filed Jan. 14, 1965   2 Sheets-Sheet 1

INVENTOR
MICHAEL S. WITHERS
BY
ATTORNEY

April 25, 1967　　　　M. S. WITHERS　　　　3,315,740
FLEXIBLE PLASTIC TUBE BUNDLE AND METHOD OF MAKING
Filed Jan. 14, 1965　　　　　　　　　　　　　2 Sheets-Sheet 2
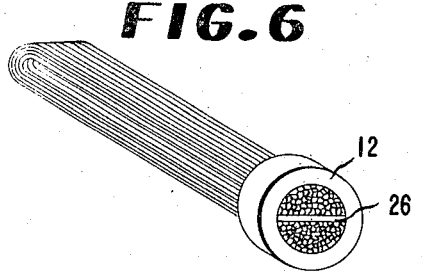
FIG.6
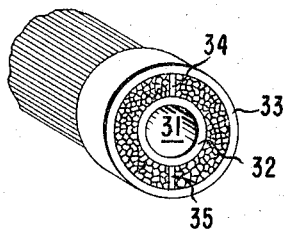
FIG.7
FIG.9
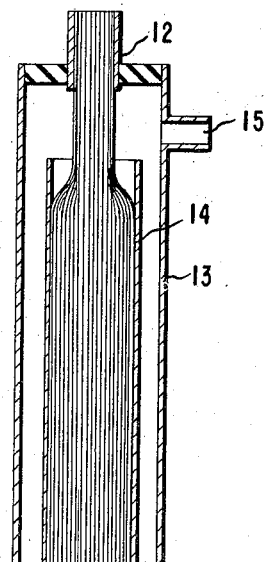
FIG.4
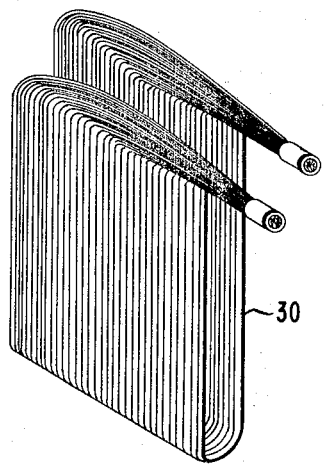
FIG.8
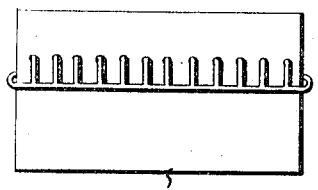
16A
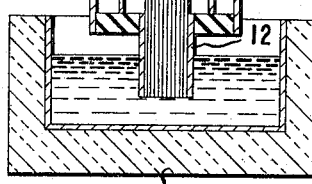
16B
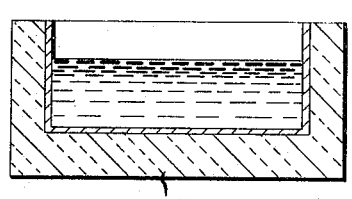
16C
INVENTOR
MICHAEL S. WITHERS
BY Herbert M Wolfson
ATTORNEY

United States Patent Office 3,315,740
Patented Apr. 25, 1967

3,315,740
FLEXIBLE PLASTIC TUBE BUNDLE AND
METHOD OF MAKING
Michael S. Withers, Wilmington, Del., assignor to E. I. du Pont de Nemours and Company, Wilmington, Del., a corporation of Delaware
Filed Jan. 14, 1965, Ser. No. 425,507
22 Claims. (Cl. 165—172)

This application is a continuation-in-part of my copending application, Ser. No. 389,109, filed Aug. 12, 1964.

This invention relates to heat exchangers and, more particularly, to the preparation of a bundle of plastic tubes for heat exchange use.

In U.S. patent application Ser. No. 389,109, filed Aug. 12, 1964, assigned to the assignee of the present application, is described a novel heat exchanger that is compact, lightweight, etc., yet has a heat transfer capacity comparable to an all-metal heat exchanger. A process for converting tubular thermoplastic materials such as the polymers of fluorocarbons, amides, acetals, esters, olefins, vinyl halides, styrene, etc., into the novel heat exchanger is also described. Basically, the process described involves forming a tube bundle by first preparing a warp of parallel hollow polymeric filaments, the width of the warp being defined by its two edge filaments and bonding a plurality of spaced tapes at least one of which tapes is disposed at an angle of 90 degrees to the warp to the filaments of the warp, the length of the tape that is disposed at an angle of 90 degrees to the warp being longer than the width of the warp to provide a trailing tab. Thereafter, by convolutely winding the tapes about an edge filament as the axis and bonding the trailing tab to the previous turn of the tape, the tube bundle of substantially parallel, hollow polymeric filaments is formed and can be used in the preparation of a heat exchanger.

The object of the present invention is to convert the end portions of the aforementioned tube bundle and of tube bundles, in general, into a fluid-tight arrangement, particularly for heat exchange use where a fluid can be passed into the interior of the hollow filaments or tubes while a separate fluid can be passed on the outside of the tubes without any mixing of the two fluids. It is a further object to specify a unique process for gathering the ends of the bundle of substantially parallel thermoplastic tubes into such a fluid-tight arrangement. It is a still further object to form the overall fluid-tight arrangement of the tube bundle and a sleeve encompassing at least one end of the bundle. Other objects will appear hereinafter.

The objects are accomplished by gathering a plurality of thermoplastic hollow filaments or tubes in a manner such that the ends of said tubes are in a contacting substantially parallel relationship; placing an end portion of these tubes within a sleeve that is rigid relative to said tubes to substantially fill said sleeve, said sleeve having either a thermoplastic inside surface or not, the amount of free area being preferably about 5% greater than the "theoretical free area," as defined hereinafter; introducing a heated fluid into the interiors of the end portions of said tubes to heat the end portions at least to the melting point of the thermoplastic material; imposing a pressure differential across the walls of said tubes so that the pressure within the tubes is greater than the pressure on the exterior surfaces of the tubes whereby the tubes expand and reshape from circular cross-sections to cross-sections of three-sided to six-sided polygons; and, thereafter, cooling said end portions to form a fused or integrally bonded fluid-tight end arrangement.

"Theoretical free area," as used herein, refers to the total cross-sectional area encompassed by the interior wall of the sleeve minus the sum of the cross-sectional areas encompassed by the outer surfaces of the tubes, the tubes being completely (tightly) packed in the sleeve on triangular centers, i.e., not one more tube can be inserted into the sleeve without distorting a tube. It has been discovered that where the tube bundle and sleeve are combined, both being at room temperature, it is important that the free area prior to processing be greater than the theoretical free area for the successful formation of a fluid-tight arrangement of the end portions of the tubes within the sleeve in conjunction with obtaining a maximum flow area for the fluid within the hollow filaments or tubes.

It should be understood that the process described is particularly suitable for forming relatively strong (having good mechanical and shear strengths) bundles of flexible, as opposed to rigid, thermoplastic tubes, the bundles having fluid-tight, bonded end portions, where the depth of the bonded end portion is at least ten times the wall thickness of the tubes. It is apparent that flexible tubes are a necessity where tapes are used in the convolute winding procedure since the central portion of the tube bundle, where the tapes are located, will necessarily be of a larger diameter than the end portions where fusion of the tubes occurs and only flexible tubes can occupy both diameters. Furthermore, flexible tubes are desirable in order to provide versatility in the ultimate products. Thus, flexible tubes can be used in heat exchangers where any bending or angling of the tube bundle is involved. Flexible tubes can be used for elongated bundles that are placed inside flexible hoses for heating or cooling liquids that are being unloaded or transferred. However, prior to the process of this invention, the flexibility of the tubes made it virtually impossible to fuse the end portions successfully. Processes such as that disclosed in U.S. Patent No. 2,433,546 would tend to buckle flexible tubes, particularly where such tubes were of any substantial length, before fusion could occur.

The novel product of the invention is defined as a bundle of substantially parallel, flexible thermoplastic tubes, usually at least 7 tubes to about 5,000 tubes or more, sometimes as high as 20,000 tubes, each tube having an outside diameter of 0.002–1.00 inch, preferably 0.040–1.00 inch, and a wall thickness of 5–20% of the outside diameter, the walls of the tubes that comprise at least one end portion, usually the walls of the tubes at both end portions, being integrally bonded or fused to the walls of adjacent tubes to a depth that is at least about 10 times, preferably at least 20 times, the average wall thickness of the tubes. The wall thickness is usually the same for all tubes. In the event that there are minor variations, adequate mechanical and shear strengths are obtained if the average wall thickness is used. Preferably, the depth of the integrally bonded or fused end portion(s) is at least 0.4 and usually no more than about three times the largest dimension of the cross-section of the close-packed or fused end of the bundle. In the most preferred product, the fused or integrally bonded end portion(s) is disposed within a relatively rigid sleeve or flange of or lined with (intimately bonded to the sleeve) a thermoplastic material, usually the same material as the tubes, and the fused end portion is further fused or integrally bonded to the thermoplastic internal surface of this sleeve or flange. The bundle ends having such integral flanges can be fastened easily into metal (carbon steel, brass, stainless steel, aluminum) or plastic ("Delrin"[1] acetal resin, phenolic resin, "Teflon"[2] lined steel, etc.) shells for heat exchange

[1,2] Registered trademark of E. I. du Pont de Nemours and Company.

use. Although heat exchange use is the primary purpose of the described bundles, they may also be used for gas separation, desalination of salt water, etc., and, where only one end portion is fused, as spargers for introducing gas into a liquid, the fused end disposed in the light; as a mixer for pipeline reactors, the fused end inserted in the pipeline and gas fed through some of the tubes and liquid fed through others, etc.

It should be understood that the sleeve may be circular, hexagonal, rectangular, etc., depending upon the particular use desired for the tube bundle. It should also be understood that the tubes of the bundle are usually all of the same diameter and wall thickness. However, this is not absolutely essential. Thus, various diameters may be employed in order to minimize the free area at the start of the process.

It should further be understood that thermoplastic tubes will usually refer to monolithic tubes of thermoplastic material. However, tubes for use in this invention may also be formed of spirally wound thermoplastic tapes; of coaxial, contiguous tubes of thermoplastic materials; of the combination of thermoplastic tapes spirally wound about thermoplastic tubes. Thermoplastic materials for use as filaments and integral sleeves or sleeve liners, where sleeves or lined sleeves are employed, include any thermoplastic material, usually a polymeric material, that can be formed into a self-supporting tube and can be softened or melted for bonding purposes without being degraded or oxidized. Such thermoplastic materials may be found among the addition and condensation polymers or even among polymers formed by oxidative-coupling. Thus, the following provides a modest, though not complete, list of useful materials: the polymeric perhalocarbon resins, e.g., polytetrafluoroethylene, polyhexafluoropropylene, polytrifluorochloroethylene; copolymers of tetrafluoroethylene with hexafluoropropylene, perfluoropentene-1, perfluorohexene-1, perfluorocyclobutene, perfluoroheptene-1, perfluorooctene-1, perfluorononene-1; polymers of aliphatic alpha-olefins, e.g., homopolymers and copolymers of ethylene, propylene, butene-1, pentene-1, hexene-1, octene-1, decene-1, butadiene, styrene; polymers of vinyl halides, e.g., polymers of vinyl chloride, vinyl fluoride, vinylidene fluoride; polymers of amides, e.g., hexamethylene adipamide, hexamethylene sebacamide, caprolactam, etc.; polyacetals, e.g., polyoxymethylene, formaldehyde copolymers; polyaromatic ethers, e.g., polyphenylene oxide; meta-diethynylbenzene polymers; polyurethanes; polyesters, e.g., polycarbonates, polyacrylates (polymethyl methacrylate), polyalkylene dicarboxylates (polyethylene terephthalate); chlorinated polyethers, etc. The preferred materials are the copolymers of tetrafluoroethylene and hexafluoropropylene, polyamides, polyolefins, polyacetals.

The invention will be more clearly understood by referring to the drawing in which:

FIGURE 4 is a schematic illustration of one apparatus for carrying out a process within the scope of this invention;

FIGURES 6–10 are illustrations of products that can be made using the basic process of this invention.

Figure 1:
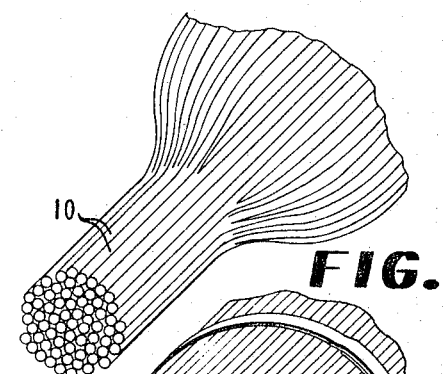
FIGURES 1, 2 and 3 illustrate the progression from free flexible thermoplastic hollow filaments or tubes to an ultimate "honeycomb" tube bundle fused or integrally bonded to a thermoplastic or thermoplastically lined sleeve.

In the embodiment shown in FIGURE 4, a bundle 11 of substantially parallel tubes 10, the bundle being that shown in FIGURE 1, is placed within a rigid sleeve 12 of or having an integrally lined surface of the same thermoplastic material as that of the filaments in a manner such that the free area is about 5% greater than the "theoretical free area" of the empty sleeve. One outstanding example of a thermoplastic material for use in this process is "Teflon" FEP[3] (a copolymer of tetrafluoroethylene and hexafluoropropylene). In Table I are shown some representative tube bundles, sleeve diameters, along with operable free areas for use in this process and the depth of fusion obtained. The tubes and sleeves (or their internal surfaces) are of the tetrafluoroethylene/hexafluoropropylene copolymer. The tubes have an outside diameter of 0.1 inch and a wall thickness of 0.01 inch.

TABLE I

| Tube Bundles | | Sleeves | | Free Area (square inches) | Depth of Fusion (inches) |
|---|---|---|---|---|---|
| Number of tubes | Length of tubes (inches) | Inside Diameter (inches) | Thickness (inches) | | |
| 140 | 15–45 | 1.37 | 0.25 | 0.37 | >1 |
| 165 | 36–96 | 1.48 | 0.25 | 0.43 | >1 |
| 250 | 24–96 | 1.81 | 0.40 | 0.59 | >1 |
| 650 | 48–96 | 2.86 | 0.45 | 1.29 | >2 |

Figure 2:
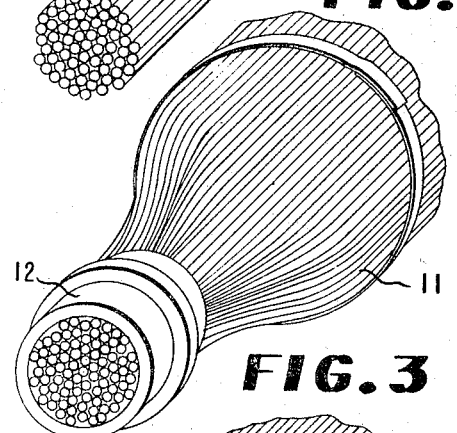

The bundle 11 with end sleeve 12 applied is shown in FIGURE 2. It is placed in a hollow cylindrical metal canister 13 containing a bundle support cradle 14 and an inlet port 15. The canister 13 provides leak-tight integrity between its interior surface and the exterior surface of the sleeves. In the first step each end of the bundle is trimmed to provide that the sleeve 12 and tubes 10 all terminate in a flat common plane. The ends of the canister-enclosed bundle consisting of the orderly consolidation of the tubes 10 inside of the hollow restraining sleeve 12 is brought in close proximity to (about 1/32–1/8 inch from) the flat surface of an electrically heated hot-plate 16A, the plate being heated to a temperature of about 950° F. sufficient to soften the thermoplastic tubes of tetrafluoroethylene/hexafluoropropylene copolymer to a depth of approximately .05 to .15 inch. The accompanying radial and circumferential expansion of the hollow filaments 10 toward the relatively thick wall of the external sleeve 12 serves to progressively reduce the intrafilament and filament-to-sleeve voids. After the end portions of the tubes have reached the softening point, a low vacuum of approximately 3 to 5 inches of mercury is applied within the sleeve external to the tubes through the port 15 of the canister 13. This causes a differential pressure or force normal to the interface of the contacting softened surfaces of the tubes 10. This force is maintained for about 30 seconds. The assembly is then cooled either by allowing heat to dissipate into the adjacent material or by using a liquid quenching medium or by forcing air through the tubes. This cooling step permits the tubes to solidify in their fused condition. Light air pressure is then applied between the external surfaces of the tubes to assure that no leaks between tubes and between tubes and the sleeve exist in the resulting face-seal.

In order to provide additional fusion of the end portions of the tubes beyond the 0.15 inch accomplished in the face-sealing step, the face-sealed bundle in the canister 13 is alternately immersed into and withdrawn from a hot silicone oil bath 16B, the temperature of the bath being about 400° F. approximately 70% of the softening temperature of the thermoplastic material being used. The depth of immersion is substantially equal to the inside diameter of the sleeve. This alternate immersion and withdrawal at about five-second intervals introduces hot oil into the filaments and around the outside of the restraining sleeve to gradually heat the thermoplastic materials. After the temperature has reached approximately 400° F., the assembly is withdrawn from the hot oil bath and a vacuum is again applied through port 15 for about 15 seconds to align or settle the now partially expanded tubes ---
[3] Registered trademark of E. I. du Pont de Nemours and Company.

10. The preheated assembly is transferred to a position above a second hot oil bath, 16C, which bath is maintained at a temperature of 600° F. which is sufficiently high to soften the thermoplastic tubes and the thermoplastic sleeve. By alternately immersing the assembly and withdrawing it from this oil bath at five-second intervals, the tubes and sleeve assembly are gradually heated to the softening temperature. The assembly in the softened state with the tubes expanded and in close contact with each other is withdrawn from the oil; and, again, a vacuum of up to 5 inches of mercury is applied exterior to the tubes for about 15 to 45 seconds. This external vacuum in combination with the atmospheric pressure within the tubes generates a pressure or force across the molten interfaces to cause fusion of the outer surfaces of the thermoplastic tubes with each other and with the inner surface of the sleeve. Thereafter, the assembly is cooled to provide a fluid-tight arrangement of the tubes within the sleeve. The assembly is checked for leaks and is inspected to be sure that the tubes have remained open and, if a flat face is desired, the assembly may be retrimmed.

At this stage, the individual tubes have reshaped themselves from their original circular cross-sections into essentially polygonal cross-sections, the polygon having anywhere from three to six sides. The resulting so-called "honeycomb" fluid-tight arrangement is shown in FIG-URE 3. It should be noted that in the aforementioned dipping cycles, the depth of each dip can be progressively increased in order to increase the temperature along the length of the tubes gradually and uniformly and to minimize inordinate temperature differences between tubes. It should also be noted that although hot silicone oil was used, other materials (alloys, salts, etc.) that are stable at the melting temperature of the thermoplastic material, non-reactive with the material, and sufficiently fluid at this temperature to rise into the interiors of the tubes may be used.

The above-described process involves forming a fluid-tight arrangement of tubes with an external sleeve surrounding and fused to the peripheral tubes. It should be understood that the canister itself, which is normally made of aluminum, can act as an inert non-thermoplastic sleeve. By following the procedure described previously, a fluid-tight arrangement of the tubes alone can be produced by using the inert canister as the external sleeve during the processing. The resultant bundle, after removal from the canister, contains only a fluid-tight arrangement of tubes. It may also be possible with some plastic materials (polyvinyl chloride) to use solvents instead of heat which will cause softening and expansion of the tubes. The use of such solvents in conjunction with the imposition of a pressure differential across the walls of the tubes should result in the desired integrally bonded fluid-tight end arrangement.

Figure 5:
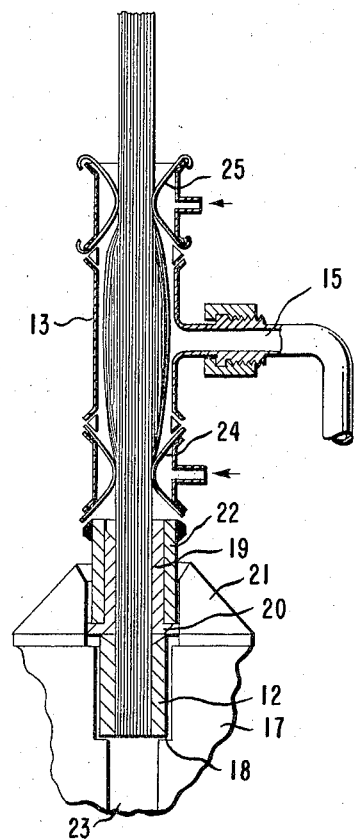
FIGURE 5 is a schematic illustration of another apparatus for carrying out a process within the scope of this invention.

In the embodiment shown in FIGURE 5 for carrying out the process of this invention, an air heater alone is used by which controlled and calibrated air flow is forced through the tube bundle to provide the previously described fluid-tight arrangement. Basically, this process is an extension of the previously described face-sealing operation in which fusion of the tubes is extended deeper and deeper into the bundle face by forcing hot air through the bundle in a carefully controlled manner. The process will be described using the same tube and sleeve material as in the previously described embodiment. Specifically, the process involves inserting a sleeve 12, preheated to a temperature of 580° F., into the cavity of oven 17, the surface of the oven being adapted to effect a seal with the sleeve at 18. When such preheating is used, it is advantageous that the internal surface only of the sleeve, rather than the complete sleeve, be of the thermoplastic material. This will reduce any tendency of the sleeve to deform or distort during preheating, prior to insertion of the tube bundle. The tube bundle 11, already trimmed and mounted in canister 13, is inserted in the sleeve 12 to a predetermined depth using canister guide plate 21 and telescopic sleeve 22. The number of tubes in the tube bundle 11 and the size of the sleeve are selected so that the total amount of free area is approximately 5% greater than the "theoretical free area." The split flanged guide ring 19 surrounding the bundle 11 serves to form a seal with sleeve 12 at 20.

Figure 3:
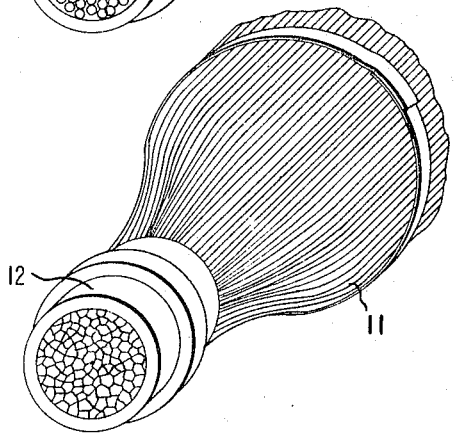

Slight pressure is applied to the rubber tubes 24 and 25 mounted within the canister 13 to hold the bundle in place. Thereafter, air heated to 600° F. is fed at 23 through the oven section 17 and through the tubes at a rate of 3–4 cubic feet per minute. After about 15 seconds of hot air flow, a vacuum of about 3–5 inches of mercury is drawn through port 15. This provides the desired pressure differential between the interiors and exteriors of the tubes. The vacuum is applied for a period of about 20–45 seconds; the flow of hot air is continued for a total of 60–90 seconds; and, after cooling, a "honeycomb" arrangement similar to that shown in FIGURE 3 is obtained to a depth of fusion of 1½–2½ inches.

This process may be used substantially interchangeably with the first-described process. The process has been used with bundles of 155–275 tubes, the tubes being 0.1 inch in diameter, having a 0.01 inch wall thickness, and being from 15 inches to 96 inches long. The advantages of this second process are obvious. No foreign liquids are used which might contaminate the bundle and the process can be performed in a comparatively short period. The use of lower air flow rates for the same depth of fusion will require longer cycles.

It should be noted that besides completely homogeneous thermoplastic sleeves, it is possible to use a metal sleeve coated internally with a thermoplastic or a perforated metal sleeve embedded in a thermoplastic material or the previously mentioned higher melting thermoplastic material ("Teflon" polytetrafuoroethylene) having bonded to its internal surface a liner of a lower melting thermoplastic ("Teflon" FEP) such as that used for the tubes. Although the same thermoplastic material for both tubes and sleeve or internal surface of the sleeve is preferred, different thermoplastic materials may be used.

Among the variety of heat exchangers that rely on the flexibility of tubes and can be made by the process of this invention are two so-called U-tube exchangers shown in FIGURES 6 and 7. These exchangers can be used where space is at a premium. Thus, they may be used as gasoline coolers, lubricating oil coolers, immersion heaters, etc. To prepare the embodiment shown in FIGURE 6, the sleeve 12 is fitted with thermoplastic plate 26 to divide the cross-section of the sleeve into two substantially equal parts. Then, by inserting one end portion of the tube bundle 11 in the area bounded by the plate and one-half the inner circumference of the sleeve and inserting the other end portion of the same tube bundle, after bending the tubes into U-shape, into the area bounded by the plate and the other half of the inner circumference of the sleeve, either of the two processes shown in FIGURES 4 and 5 can be employed to fuse the end portions of the tubes, the plate and the inner surface of the sleeve to form a fluid-tight arrangement Of course, the processes can be used to form a straight, not U-shaped, tube exchanger having a dividing plate in the two end portions of such an exchanger. It should also be understood that the plate 26 need not be any longer than the depth of the sleeve.

The embodiment shown in FIGURE 7 is prepared in two separate steps, each of which is substantially the process of the invention. Thus, one end portion 27 is fused to sleeve 28 as described for FIGURES 4 and 5. The tubes are bent in U-shape and fitted snugly in the annular space between sleeves 28 and 29. The inner fused tubes 27 and the previously fused portion of sleeve 28 are insulated in a manner to permit a differential pressure to be applied to the tubes and the process, preferably that shown in FIGURE 5, is repeated to effect fusion of the tubes in the annular space to each other and to sleeves 28 and 29. The process can be used to form a straight, not U-shaped tube exchanger by performing the first fusing step at both ends; adding an additional ring of tubes about the inner sleeves and performing the second fusing step at both ends.

The embodiment shown in FIGURE 8 is prepared in accordance with either process shown in FIGURE 4 or FIGURE 5. After fusion to form the fluid-tight end arrangement, the unfused tubes may be separated as shown to form the flat warp 30. Such arrangements are useful as immersion coolers in such applications as sulfuric acid coolers, sodium perborate crystallizers, etc., or as evaporative coolers.

In FIGURE 9 is disclosed another end arrangement that may be prepared by the process of this invention. In this embodiment, the central portion is first plugged at 31 and the tube bundle 11 is fitted in the annular space between a ring 32 having an outer thermoplastic surface and the outer sleeve 33 having an internal thermoplastic surface. Plates 34 and 35 of thermoplastic material may be fitted to hold the ring 32 in place. Fusion of the tubes to the outer surface of the ring, to the inner surface of the sleeve, to the plates, and to each other, may be effected in accordance with the process shown either in FIGURE 4 or FIGURE 5. The plug at 31 is removed providing the inlet for the shell-side fluid in the ultimately-prepared heat exchanger. It should be understood that variations of FIGURES 6, 7 and 9 involving one, two, three or more plates; one, two or more sleeves (rings), etc., can be made using the process of this invention and the resulting products are meant to be included within the scope of this invention.

Figure 10:
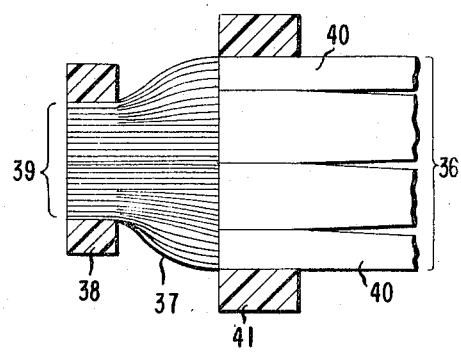

FIGURE 10 discloses still another end arrangement that may be prepared in accordance with this invention. Thus, the end portion of the bundle 36 of large diameter tubes 40 is fused into a fluid-tight arrangement within sleeve 41 by any of the processes within the scope of this invention. Thereafter, the smaller diameter tubes 37 are inserted through the tubes of bundle 36. Sleeve 38 is fitted about the bundle 39 of the gathered tubes 37 and the process of this invention is repeated in a manner to fuse the tubes in the end portion of bundle 39 to each other and to the inner surface of the sleeve 38.

What is claimed is:

1. An article of manufacture consisting essentially of at least one relatively rigid sleeve having a thermoplastic internal surface and a bundle of a plurality of substantially parallel flexible thermoplastic tubes, at least one end portion of said bundle disposed within said sleeve, the walls of said tubes at said end portion of said bundle being integrally bonded to the walls of adjacent tubes, the walls of the peripheral tubes of said bundle also being integrally bonded to the internal surface of said sleeve in a fluid-tight arrangement to a depth at least equal to the depth of bonding of said tubes to each other, the depth of bonding of said tubes to each other is at least 0.4 times the largest dimension of the cross-section of the bonded end of said bundle.

2. An article of manufacture as in claim 1 wherein said relatively rigid sleeve is completely thermoplastic.

3. An article of manufacture as in claim 1 wherein said bundle is composed of at least seven tubes.

4. An article of manufacture as in claim 1 wherein said tubes have an outside diameter of 0.002–1.00 inch and a wall thickness of 5–20% of the outside diameter.

5. An article of manufacture as in claim 1 wherein said tubes have an outside diameter of 0.040–1.00 inch and a wall thickness of 5–20% of the outside diameter.

6. An article of manufacture as in claim 1 wherein both end portions of said bundle are disposed within relatively rigid sleeves having thermoplastic internal surfaces, the walls of the tubes at each end portion of the bundle being integrally bonded to the walls of adjacent tubes, the walls of the peripheral tubes of said bundle also being integrally bonded to the internal surfaces of said sleeves in a fluid-tight arrangement to a depth at least equal to the depth of bonding of said tubes at said end portion to each other.

7. An article of manufacture as in claim 1 wherein said thermoplastic tubes and said thermoplastic internal surfaces of said sleeve are of a thermoplastic material selected from the group consisting of copolymers of tetrafluoroethylene and hexafluoropropylene, polyamides, polyolefins and polyacetals.

8. An article of manufacture as in claim 1 wherein the depth of bonding of said tubes to each other is at least 0.4 and no greater than 3 times the largest dimension of the cross-section of the bonded end of said bundle.

9. An article of manufacture as in claim 1 wherein said tubes are of a copolymer of tetrafluoroethylene and hexafluoropropylene.

10. In a heat exchanger comprising a bundle of flexible thermoplastic tubes, means for passing one fluid into the interiors of said tubes and means for passing a second fluid about the outer surfaces of said tubes, the improvement wherein said tubes at at least one end portion of said bundle are substantially parallel and the walls of said tubes at said end portion of said bundle are integrally bonded to the walls of adjacent tubes to a depth of at least 0.4 times the largest dimension of the cross-section of the bonded end of said bundle.

11. A heat exchanger as in claim 10 wherein said bundle is composed of at least seven tubes.

12. A heat exchanger as in claim 10 wherein said tubes have an outside diameter of 0.002–1.00 inch and a wall thickness of 5–20% of the outside diameter.

13. A heat exchanger as in claim 10 wherein said tubes have an outside diameter of 0.040–1.00 inch and a wall thickness of 5–20% of the outside diameter.

14. A heat exchanger as in claim 10 wherein the walls of the tubes at both end portions of said bundle are integrally bonded to the walls of adjacent tubes.

15. A heat exchanger as in claim 10 wherein said tubes are of a thermoplastic material selected from the group consisting of copolymers of tetrafluoroethylene and hexafluoropropylene, polyamides, polyolefins and polyacetals.

16. A heat exchanger as in claim 10 wherein said tubes are of a copolymer of tetrafluoroethylene and hexafluoropropylene.

17. A heat exchanger as in claim 10 wherein said depth is at least 0.4 and no greater than 3 times the largest dimension of the cross-section of the bonded end of said bundle.

18. A process consisting essentially of gathering a plurality of tubes of thermoplastic material in a manner such that the end portions of said tubes are in a contacting parallel relationship; placing an end portion of said gathered tubes within a sleeve, said sleeve being rigid relative to said tubes, to leave free area, the amount of free area being about 5 percent greater than the theoretical free area; heating a fluid to a temperature at least equal to the softening point of said thermoplastic material; introducing a fluid into the interiors of the end portions of said tubes; imposing a pressure differential across the walls of said tubes so that the pressure within said tubes is greater than the pressure on the exterior surfaces of the tubes and, when said pressure differential is imposed, said end portions of said tubes are at least at the softening point of said thermoplastic material whereby said tubes expand and fuse with the surfaces of adjacent tubes; and, thereafter, cooling said end portions to form a fused fluid-tight end arrangement.

19. A process as in claim 18 wherein a heated fluid is introduced into the interiors of the end portions of said tubes to heat said end portions at least to the softening point of said thermoplastic material.

20. A process as in claim 18 wherein the internal surface of said relatively rigid sleeve is also thermoplastic so that said fused fluid-tight end arrangement is composed of said tubes surrounded by said sleeve.

21. A process as in claim 18 wherein said tubes are of a thermoplastic material selected from the group consisting of copolymers of tetrafluoroethylene and hexafluoropropylene, polyamides, polyolefins and polyacetals.

22. A process as in claim 18 wherein said tubes are of a copolymer of tetrafluoroethylene and hexafluoropropylene and said fluid is silicone oil.

References Cited by the Examiner

UNITED STATES PATENTS

| | | | |
|---|---|---|---|
| 2,433,546 | 12/1947 | Cornelius | 156—196 |
| 2,477,852 | 8/1949 | Bacon | 156—296 X |
| 2,974,404 | 3/1961 | Humenik et al. | 29—157.3 |
| 3,211,540 | 10/1965 | Cole | 156—296 X |
| 3,224,851 | 12/1965 | Hick | 156—296 X |
| 3,233,662 | 2/1966 | Yuen | 165—46 |

ROBERT A. O'LEARY, Primary Examiner.

A. W. DAVIS, Assistant Examiner.